United States Patent
Tripp

(10) Patent No.: US 10,061,682 B2
(45) Date of Patent: *Aug. 28, 2018

(54) DETECTING RACE CONDITION VULNERABILITIES IN COMPUTER SOFTWARE APPLICATIONS

(71) Applicant: International Business Machines Corporation, Armonk, NY (US)

(72) Inventor: Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,128

(22) Filed: Oct. 30, 2017

(65) Prior Publication Data

US 2018/0046566 A1    Feb. 15, 2018

Related U.S. Application Data

(63) Continuation of application No. 15/288,193, filed on Oct. 7, 2016, now Pat. No. 9,916,222, which is a continuation of application No. 15/073,810, filed on Mar. 18, 2016, now Pat. No. 9,529,695, which is a continuation of application No. 14/040,884, filed on Sep. 30, 2013, now abandoned.

(51) Int. Cl.
*G06F 11/36* (2006.01)
*G06F 21/57* (2013.01)
*G06F 9/52* (2006.01)

(52) U.S. Cl.
CPC ........... *G06F 11/3644* (2013.01); *G06F 9/52* (2013.01); *G06F 11/3612* (2013.01); *G06F 11/3632* (2013.01); *G06F 11/3668* (2013.01); *G06F 11/3688* (2013.01); *G06F 21/577* (2013.01); *G06F 2221/033* (2013.01)

(58) Field of Classification Search
CPC ........... G06F 2221/033; G06F 21/577; G06F 11/3688; G06F 11/3612
USPC ........................................................ 717/130
See application file for complete search history.

(56) References Cited

U.S. PATENT DOCUMENTS 9,135,082 B1    9/2015  Sheng et al.
2008/0209436 A1 *  8/2008  Agha .................. G06F 11/3632
                                               718/106

(Continued)

*Primary Examiner* — John Chavis
(74) *Attorney, Agent, or Firm* — Cantor Colburn LLP

(57) ABSTRACT

Testing computer software applications is performed by identifying first and second executable portions of the computer software application, where the portions are configured to access a data resource, and where at least one of the portions is configured to write to the data resource, instrumenting the computer software application by inserting one or more instrumentation instructions into one or both of the portions, where the instrumentation instruction is configured to cause execution of the portion being instrumented to be extended by a randomly-determined amount of time, and testing the computer software application in multiple iterations, where the computer software application is executed in multiple parallel execution threads, where the portions are independently executed at least partially in parallel in different threads, and where the computer software application is differently instrumented in each of the iterations.

1 Claim, 4 Drawing Sheets

(56) References Cited

U.S. PATENT DOCUMENTS

2012/0204062 A1    8/2012   Erickson et al.
2013/0185524 A1    7/2013   Sakada

\* cited by examiner

```
Servlet A {

Public void doGet(Request req, Response resp) {
      Session session = req.getSession();
      String userPrefs = session.getAttribute("uprefs");
      if (userPrefs == null) {
        String uname = req.getParameter("name");
        userPrefs = readUserPrefsFromDB(uname); // Source }
        userPrefs = sanitize(userPrefs); // Sanitizer
        session.setAttribute("uprefs", userPrefs); }
      ...
      String uprefs = session.getAttribute("prefs");
      ...
      resp.getWriter().write("Your recorded preferences: " + uprefs); // Sink }
  }

Servlet B {

Public void doGet(Request req, Response resp) {
    Session session = req.getSession();
    String userPrefs = session.getAttribute("uprefs");
    if (userPrefs == null) {
     String uname = req.getParameter("name");
     userPrefs = readUserPrefsFromDB(uname); // Source }
     session.setAttribute("uprefs", userPrefs); }
     ... }
  }
```

DETECTING RACE CONDITION VULNERABILITIES IN COMPUTER SOFTWARE APPLICATIONS

DOMESTIC PRIORITY

This application is a continuation of the legally related U.S. application Ser. No. 15/288,193 filed Oct. 7, 2016 which is a continuation of U.S. application Ser. No. 15/073,810 filed Mar. 18, 2016 now U.S. Pat. No. 9,529,685, which is a continuation of U.S. application Ser. No. 14/040,884 filed Sep. 30, 2013, which are fully incorporated herein by reference.

BACKGROUND

The present disclosure relates to testing computer software applications in general, and more particularly to detecting race condition vulnerabilities in computer software applications.

Race conditions are often the cause of subtle functional bugs in multi-threaded software systems. Beyond functional problems, race conditions can also potentially lead to security vulnerabilities. For example, in one well-known race condition example an attacker may read and alter protected files in the Unix™ file system. In another well-known example, race conditions arise due to interaction between a web-based application and an underlying relational database, thereby exposing the database to unauthorized access.

Discovering race conditions is challenging in that, by definition, they manifest only in specific thread interleavings. Static analysis suffers from inherent limitations in modeling thread interleavings in a sound and accurate manner, and thus typically yields highly inaccurate results in detecting race conditions in industry-scale applications where scalability is key. Dynamic testing, on the other hand, is challenged by the fact that most thread interleavings do not highlight a latent race condition, and thus running the subject application a small number of times is unlikely to yield satisfactory coverage. Checking all possible interleavings is also impractical for large applications, and thus effective testing for data races remains a challenge.

SUMMARY

In one embodiment of the present invention, a method is provided for testing computer software applications. The method includes identifying a first executable portion of a computer software application and a second executable portion of the computer software application, where the first and second executable portions are configured to access a data resource, and where at least one of the first and second executable portions is configured to write to the data resource, instrumenting the computer software application by inserting at least one instrumentation instruction into at least one of the first and second executable portions, where the instrumentation instruction is configured to cause execution of the portion being instrumented to be extended by a randomly-determined amount of time, and testing the computer software application in each of multiple iterations, where the computer software application is executed in multiple parallel execution threads, where the first and second executable portions are independently executed at least partially in parallel in different ones of the threads, and where the computer software application is differently instrumented in each of the iterations.

In other aspects of the invention systems and computer program products embodying the invention are provided.

BRIEF DESCRIPTION OF THE DRAWINGS

The present invention will be understood and appreciated more fully from the following detailed description taken in conjunction with the appended drawings in which:

FIG. 3 is a simplified source code example for illustrating the system of FIG. 1 and method of FIG. 2.

DETAILED DESCRIPTION

Figure 1:
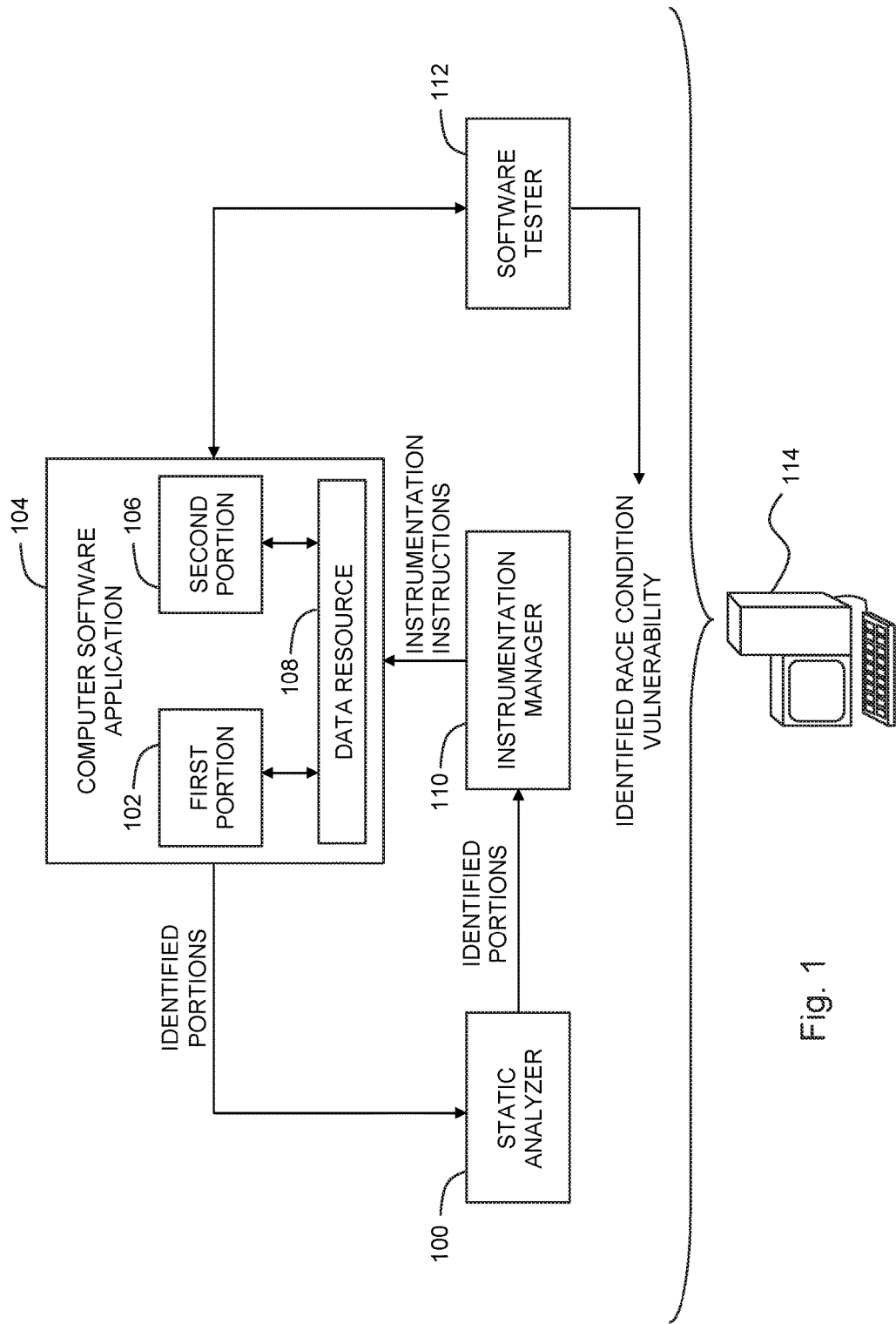
FIG. 1 is a simplified conceptual illustration of a system for testing computer software applications, constructed and operative in accordance with an embodiment of the invention.

The embodiments of the present invention will now be described, although the description is intended to be illustrative of the present invention as a whole, and is not to be construed as limiting to the embodiments shown. It is appreciated that various modifications may occur to those skilled in the art that, while not specifically shown herein, are nevertheless within the true spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™ Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for testing computer software applications, constructed and operative in accordance with an embodiment of the present invention. In the system of FIG. 1, a static analyzer 100 is configured to identify, using conventional static analysis techniques, a data interdependency between a first executable portion 102 of a computer software application 104 and a second executable portion 106 of computer software application 104, where first and second executable portions 102 and 106 are each configured to access a data resource 108, such as by reading and/or writing to the same program variable or database record, and where one or both of the first and second executable portions 102 and 106 are configured to write to data resource 108. Computer software application 104 may be any type of software application, including those configured for use with mainframe and desktop computers and mobile computing devices. For example, computer software application 104 may be a "web" application including Hypertext Markup Language (HTML)-encoded web pages that may be hosted by a computer server and accessed by one or more client computers via a computer network, such as the Internet. Such web applications may include client-side scripting. Thus, for example, first and second executable portions 102 and 106 may be separate JavaScript™ methods within the same HTML-encoded web page of a web application.

An instrumentation manager 110 is configured to instrument computer software application 104 by inserting one or more instrumentation instructions into one or both of first and second executable portions 102 and 106, where the instrumentation instructions are configured to cause execution of the portion being instrumented to be extended by a randomly-determined amount of time, e.g., on the order of tens or hundreds of milliseconds, such as where any of the instrumentation instructions causes an operation to be performed for the duration of a randomly-determined amount of time. In an embodiment, instrumentation manager 110 inserts such instrumentation instruction just before and/or just after any, and every, location where data resource 108 is read or written to.

A software tester 112 is configured to test computer software application 104 over multiple iterations using conventions techniques, such as black-box or glass-box testing, where computer software application 104 is instrumented differently in each of the iterations, such as where in different iterations computer software application 104 includes more or fewer instrumentation instructions, is instrumented in different locations, and/or where the randomly-determined amount of time associated with each of the instrumentation instructions varies from iteration to iteration. During each iteration, computer software application 104 is executed in two or more parallel execution threads, where first and second executable portions 102 and 106 are independently executed in parallel, or partly in parallel, in different ones of the threads. In an embodiment, software tester 112 is also configured to identify a race condition vulnerability associated with computer software application 104 if different values of data resource 108 are detected after different ones of the iterations. Additionally, or alternatively, software tester 112 is configured to identify a race condition vulnerability associated with computer software application 104 if it determines that during one of the iterations first executable portion 102 writes to data resource 108 before second executable portion 106 accesses the data resource, and during a different one of the iterations second executable portion 106 accesses data resource 108 before first executable portion 102 writes to data resource 108.

Any of the elements shown in FIG. 1 may be implemented by a computer, such as computer 114, by implementing any of the elements in computer hardware and/or in computer software embodied in a non-transitory, computer-readable storage medium in accordance with conventional techniques.

Figure 2:
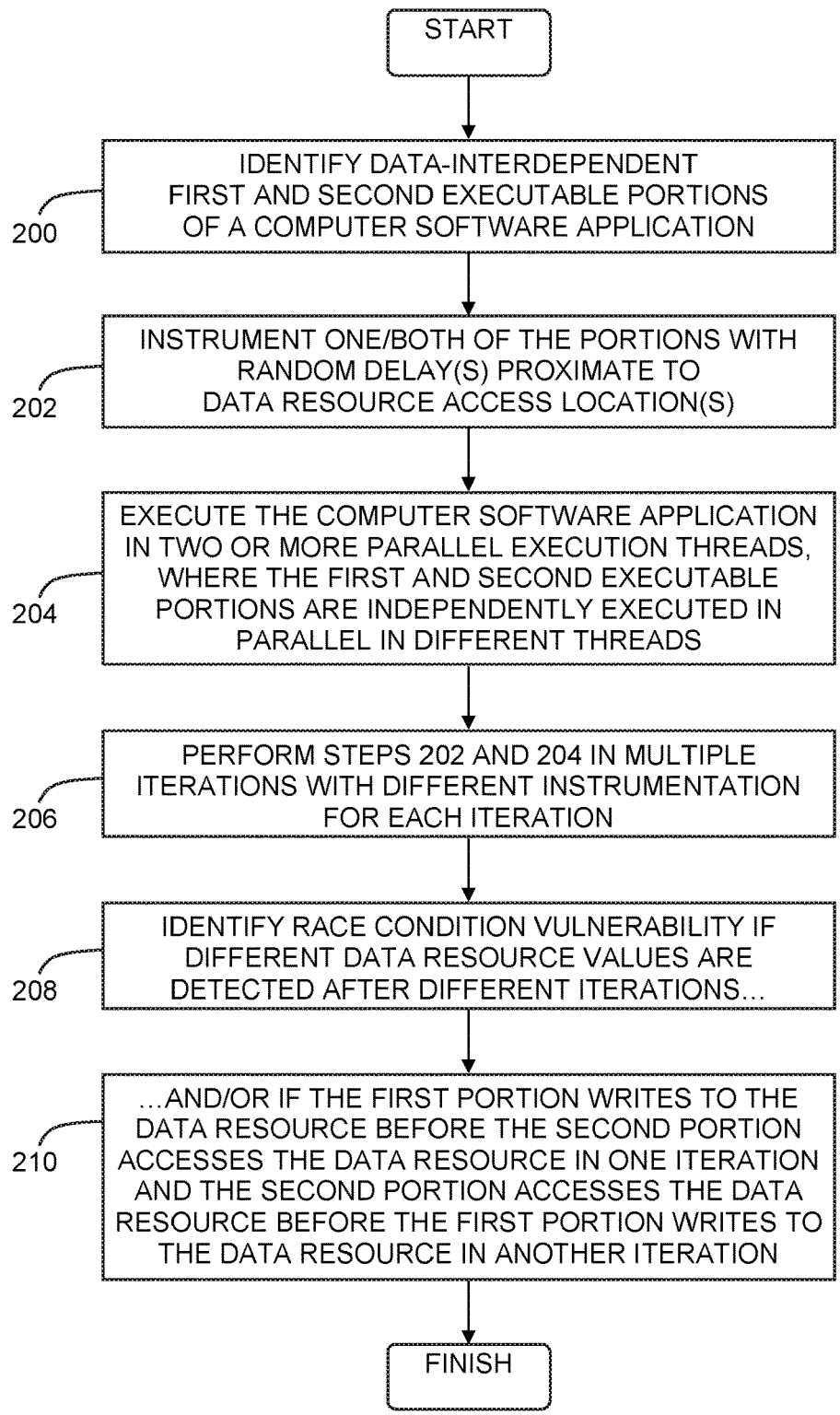
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, first and second executable portions of a computer software application are identified as being data interdependent, where each portion is configured to access a data resource, and where one or both of the portions are configured to write to the data resource (step 200). The computer software application is instrumented by inserting one or more instrumentation instructions into one or both of the first and second executable portions, in proximity to one or more locations where the data resource is accessed, where the instrumentation instructions are configured to cause execution of the portion being instrumented to be extended by a randomly-determined amount of time (step 202). The computer software application is executed in two or more parallel execution threads, where the first and second executable portions are independently executed in parallel, or partly in parallel, in different ones of the threads (step 204). The computer software application is tested over multiple iterations, where the computer software application is instrumented differently in each of the iterations (step 206). A race condition vulnerability associated with the computer software application if different values of the data resource are detected after different ones of the iterations (step 208), and/or if it is determined that during one of the iterations the first executable portion writes to the data resource before the second executable portion accesses the data resource, and during a different one of the iterations the second executable portion accesses the data resource before the first executable portion writes to the data resource (step 210).

The system of FIG. 1 and method of FIG. 2 may be illustrated in the context of the example shown in FIG. 3, in which there are two servlets labeled servlet A and servlet B. As both servlets manipulate the same session attribute, "uprefs", this introduces a potential race condition vulnerability. Furthermore, servlet B neglects to sanitize the value it reads from a database and into variable userPrefs before inserting it into the session if it's not there already. This may introduce the following vulnerable interleaving: 1) servlet A finds that "uprefs" is not in the session; 2) servlet A then reads the value of "uprefs" from the database, sanitizes it, and adds it into the session object; 3) servlet B checks for "uprefs", and also finds that it is not in the database; 4) servlet A inserts "uprefs" into the session object; 5) servlet B does the same, thereby overwriting servlet A's sanitized value with an unsanitized value; and 6) servlet A reads "uprefs" from the session and, assuming that it is sanitized, uses the read value in a security-sensitive operation. This is where a potential security vulnerability is manifested.

The system of FIG. 1 and method of FIG. 2 may be employed to find which execution units in the computer software application access the same data. Thus, for example: 1) static analysis is applied to the subject application to identify accesses to shared state information by different execution units; 2) instrumentation instructions including random wait commands are inserted around those statements that access the same data (i.e., the {get/set}Attribute calls); 3) the application is executed in single-threaded mode; 4) dependence analysis is performed on the execution trace of the single-threaded run as provided by the instrumentation. This reveals that servlets A and B both access the attribute "uprefs"; 5) for each pair (A,B) of execution units that were found to access the same data in the previous step, let $S_{a,1} \ldots S_{a,m}$ and $S_{b,1} \ldots S_{b,n}$ be the statements through which they are data-interdependent (e.g., the {get/set}Attribute calls). The application is then instrumented such that a) there is a random wait (e.g., Thread.sleep call with a random value in Java™) in between every pair of consecutive statements in $S_{a,1} \ldots S_{a,m}$, as well as in $S_{b,1} \ldots S_{b,n}$; and b) the arguments to sink statements (e.g., resp.getWriter( ).write) are checked to test whether a vulnerability has occurred; and 6) for each pair (A,B) of data-interdependent execution units, an instrumented version of the subject application is run (with the instrumentation from step 5) in a multi-threaded mode, within a testing environment (e.g., where the backend database includes test data payloads), and test data requests are sent in parallel to the application instances that invoke A and B.

Thus, in the example in FIG. 3, servlets A and B would be identified as a candidate pair for testing by the end of step 4. Then, in step 6, a vulnerability attributable to a race condition would typically be identified by enforcing random waits between {set/get}Attribute calls and focusing testing on servlets A and B which allows multiple testing rounds, and thus high coverage.

Figure 4:
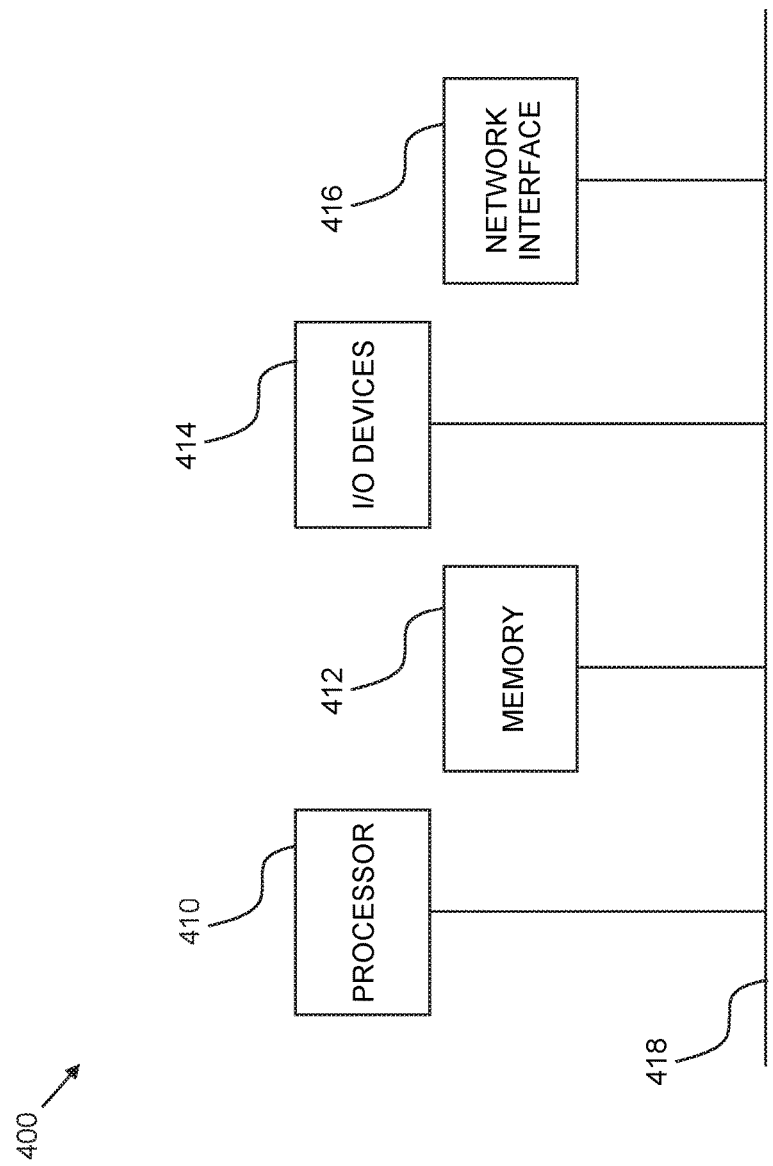
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product for testing computer software applications, the computer program product comprising:
    a computer readable storage medium having stored thereon program instructions executable by a processor to cause the processor to:
        identify a first executable portion of a computer software application and a second executable portion of the computer software application, wherein the first and second executable portions are identified as being data interdependent and the first and second executable portions are configured to access a data resource, wherein at least one of the first and second executable portions is configured to write to the data resource;
    instrument the computer software application, the instrumenting comprising inserting at least one instrumentation instruction into at least one of the first and second executable portions, and inserting the at least one instrumentation instruction proximate to a location where the data resource is accessed, wherein the instrumentation instruction is configured to cause execution of the portion being instrumented to be extended by a randomly-determined amount of time; and
    test the computer software application in each of a plurality of iterations, wherein the computer software application is differently instrumented in each of the iterations;
    wherein the computer software application is executed in multiple parallel execution threads, wherein the first and second executable portions are independently executed at least partially in parallel in different ones of the threads; and
    wherein the testing comprises identifying a race condition vulnerability associated with the computer software application if:
        during one of the iterations the first executable portion writes to the data resource before the second executable portion accesses the data resource, and
        during a different one of the iterations the second executable portion accesses the data resource before the first executable portion writes to the data resource.

* * * * *